United States Patent [19]

Bacaner

[11] E Re. 29,618

[45] Reissued Apr. 25, 1978

[54] SUPPRESSION OF CARDIAC VENTRICULAR FIBRILLATION AND CARDIAC ARRHYTHMIAS WITH BRETYLIUM TOSYLATE

[75] Inventor: Marvin B. Bacaner, Minneapolis, Minn.

[73] Assignee: The Regents of the University of Minnesota, Minneapolis, Minn.

[21] Appl. No.: 781,654

[22] Filed: Mar. 28, 1977

Related U.S. Patent Documents

Reissue of:

[64] Patent No.: 3,441,649
Issued: Apr. 29, 1969
Appl. No.: 573,209
Filed: Aug. 18, 1966

[51] Int. Cl.[2] ..... A61K 31/205
[52] U.S. Cl. ..... 424/316
[58] Field of Search ..... 424/316

[56] References Cited

PUBLICATIONS

Amer. Drug Index, (1965), pp. 105, 120 & 201.
Merck Manual, 9th Ed., (1956), pp. 202–203.
British Med. Journal, Slomar, 4–1965, pp. 895–896.
New Eng. Journ. Med. Connecticut, Feb. 1965, pp. 277–282.
Phillip E. Leveque, "Anti–Arrhythmie Action of Bretylium", Nature, vol. 207, No. 4993, pp. 203–204, July 10, 1965.

*Primary Examiner*—Stanley J. Friedman
*Attorney, Agent, or Firm*—Burd, Braddock & Bartz

[57] ABSTRACT

A method for suppressing cardiac ventricular fibrillation and cardiac arrhythmias in animals, both human and otherwise, by administration of ortho-bromo benzyl ethyldimethylammonium p-toluene-sulfonate (bretylium tosylate). The drug may be administered prophylactically in the prevention of or in the treatment of ventricular fibrillation or cardiac arrhythmias.

13 Claims, No Drawings

SUPPRESSION OF CARDIAC VENTRICULAR FIBRILLATION AND CARDIAC ARRHYTHMIAS WITH BRETYLIUM TOSYLATE

Matter enclosed in heavy brackets [ ] appears in the original patent but forms no part of this reissue specification; matter printed in italics indicates the additions made by reissue.

This invention relates to a method for suppressing cardiac fibrillation in animals, both human and otherwise, by inducing chemical sympathectomy by administration of drugs producing postganglionic adrenergic nerve blockade. More particularly the invention relates to a method for suppressing fibrillation by administration of an ortho bromo benzyl quaternary ammonium salt (bretylium tosylate).

This invention is based at least in part upon work done under a contract or grant from the United States Government.

Ventricular fibrillation is a catastrophic event associated with a number of clinical situations that affect the heart, especially as a complication of acute myocardial infarction. Half of the cases of sudden death following acute coronary occlusion have been attributed to ventricular fibrillation. The prevention and treatment of this complication is clearly one of the urgent unsolved problems facing clinical medicine.

In the course of other experiments it was observed that taking a single biopsy of the left ventricle of open chest, but otherwise intact, dogs invariably produced ventricular fibrillation. In contrast, fibrillation never occurred when repeated biopsies were taken over the course of many hours from the totally isolated blood supported dog heart removed from the chest, but beating spontaneously. It appeared that the difference between the great susceptibility of the in-situ heart to ventricular fibrillation as contrasted with the invulnerability of the isolated heart to fibrillation might be related to the sympathetic denervation of the isolated heart. To test this hypothesis several dogs were pretreated with an ortho bromo benzyl quaternary ammonium salt (bretylium tosylate; (o-bromo benzyl) ethyl-dimethylammonium p-toluenesulfonate) before in-situ ventricular biopsies were taken. This drug has an action that is roughly that of a chemical sympathectomy. It was found that multiple in-suit ventricular biopsies could be taken from the bretylium tosylate treated animals without inducing fibrillation.

An agent that can suppress the vulnerability of the heart to ventricular fibrillation has obvious interest, both as a key to understanding the mechanism which triggers and sustains fibrillation and for potential clinical use in the prevention and/or treatment of this arrhythmia. A series of experiments were undertaken to test the efficacy of bretylium tosylate in suppressing experimentally induced ventricular fibrillation in dog hearts, both with and without coronary ligation.

EXAMPLE I

Methods

Mongrel dogs of either sex ranging in weight from 9 to 35 kg. were used in this study. Under nembutal anesthesia (15–30 mg./kg.) the heart was exposed via a left thoracotomy in 4 dogs and a sternum splitting incision in 8 dogs. Needle electrodes were embedded in the 4 extremities for electrocardiographic recording. The femoral artery was cannulated for continuous blood pressure recording. A femoral vein was cannulated for injection. The pericardium was opened and the heart supported in a pericardial cradle. Ventricular fibrillation was induced by means of a pair of electrodes 1 cm. apart mounted on an insulated hand holder. The fibrillatory stimulus consisted of a continuous train of unipolar 2.5 millisecond pulses at a repetition rate of 100 pulses per second. The peak current for each pulse ranged between 20–40 milliamperes.

The routine run consisted of inducing ventricular fibrillation at 3 or 4 different sites at random over both ventricles. The heart was allowed to fibrillate for 5–20 seconds then electrically defibrillated by countershock from an AC defibrillator (usually requiring between 1–10 shocks). The heart was allowed 5 to 8 minutes to recover between episodes of fibrillation. After the stimulus time duration required to fibrillate the ventricle at several sites was established, 20 mg./kg. bretylium tosylate (Darenthin-Burroughs Wellcome & Co.) was administered intravenously in from 1 to 5 minutes. At various times after the drug was administered the electrode was reapplied to the ventricle in the neighborhood of the control fibrillation sites and kept in contact for variable periods of time to determine the stimulus duration time required to provoke fibrillation. The electrode was usually removed when fibrillation appeared to be induced or when the blood pressure fell to shock levels for more than a few seconds. Because these preliminary experiments were also designed to establish the time course of the protective effect of the drug it was not wished to provoke fibrillation each time the electrode was applied but rather to keep the electrode in contact until the ventricle appeared to fibrillate and then remove it.

Because there was no prior information on the dose of bretylium tosylate required or the maximum protection possible, 4 dogs were given a second 20 mg./kg. dose even though the vulnerability to fibrillation was already significantly reduced. Six animals were used as time controls. These animals were fibrillated every 20 minutes for 3 to 4 hours before being given the drug to rule out the possibility that time under anesthesia might influence the threshold. In 2 dogs the left anterior descending coronary artery and in the 2 the left circumflex coronary was ligated to test the effect of the drug when the heart was made more vulnerable to fibrillation by acute coronary occlusion.

Results

In the normal dog heart ventricular fibrillation was invariably induced by touching the electrode to the surface of the heart for between 0.25 to 0.35 second. There was no apparent difference in vulnerability to fibrillation by this stimulus between the right and left ventricles or between different sites on the ventricular surface.

The effect of rapid intravenous injection of bretylium tosylate on blood pressure was measured and the usual response is a moderate drop in blood pressure followed by an increase above control levels. By the end of 15 minutes the blood pressure returns to control values. The heart rate sometimes increases about 20% for 15 to 20 minutes but then also returns to normal. When the drug is given more slowly (5 minutes) these effects are minimized.

After administration of bretylium tosylate each animal was subjected to several hundred attempts to provoke fibrillation by application of the electrodes to the ventricles at different sites. In every animal tested (12) there was a clear prolongation of the time that the stimulating electrodes could be applied to the ventricular surface without provoking fibrillation. The protective effect in most animals began about 8 to 15 minutes after intravenous infusion of the drug and increased progressively to a maximum effect after 1½ to 2 hours. In each instance there was exhibited a progressive increase in tolerance to the fibrillatory stimulus. Two hours after the drug was given, there was an increase in tolerance that was never less than 3 times the control value while in some of the animals the stimulating electrodes could be applied to the ventricle for as long as 20 seconds without inducing fibrillation. The tolerated duration of stimulation in such cases was limited by the severe hypotension from asytole rather than the onset of fibrillation. The protective effect was fairly uniform at different sites but the right ventricle, though protected, was often slightly more vulnerable than the left. When prolonged stimulation in a protected animal did provoke fibrillation, defibrillation was always easily achieved with a single low level countershock.

Of significance was the frequent observation that when protection was effected the stimulated ventricle might break into ventricular tachycardia or fibrillation but when the stimulating electrode was removed the fibrillation or tachycardia would spontaneously revert to sinus rhythm even after prolonged periods of fibrillation.

The control dogs that were fibrillated every 20 minutes for 4 hours to rule out the effect of prolonged anesthesia as a factor in the tolerance developed to the fibrillatory stimulus were never found to be protected. However, when they were subsequently given bretylium tosylate they were protected as well as the other animals in the series.

Coronary ligation

The 4 animals subjected to coronary ligation were somewhat different in that there was a clear increase in regional vulnerability to fibrillation over the infarct and perinfarcted areas as compared to the other animals in the series. Before the drug was given, two of them fibrillated spontaneously, the other two did not.

One of the spontaneously fibrillating animals could not be defibrillated despite hand massage and frequent countershocks. This animal was given bretylium tosylate, injected into the superior vena cava, and cardiac massage was maintained for 10 minutes. Then, after a single countershock, the heart reverted to sinus rhythm, and this heart was then subsequently protected against stimulated fibrillation.

The depth of anesthesia was varied in a number of the control animals by allowing them to become lightly anesthetized or giving them heavy doses of nembutal. Depth of anesthesia was without detectable effect.

It appears quite clear that bretylium tosylate markedly reduces the vulnerability of the normal dog ventricle to fibrillation. Even after coronary ligation, which sharply lowers the fibrillatory threshold, bretylium tosylate profoundly protects the heart against fibrillatory stimuli.

The protective effect of this drug is manifest in a number of observed ways. (a) The time that the fibrillatory stimulus can be tolerated without inducing fibrillation is prolonged from 3 to several hundred times. (b) The stimulating electrode may induce fibrillation for as long as it is held on the ventricle but the fibrillation is often localized to the region of the electrode and does not spread with normal sinus rhythm, resuming as soon as the electrode is removed from the ventricle. (c) Fibrillation may be induced but then spontaneously reverts to sinus rhythm within a fraction of a second or as long as 20 seconds after the electrode is removed. Prior to giving bretylium we have never observed spontaneous reversion from fibrillation to sinus rhythm when the heart was fibrillated for more than a second or two. Shumway et al. (J. Thoracic Surgery, 34: 643, 1957) in a detailed study of fibrillation thresholds never observed spontaneous restoration of sinus rhythm after the ventricle fibrillated for longer than 2 seconds. After bretylium tosylate protection is established spontaneous defibrillation after 10 to 20 seconds of fibrillation is frequently seen. (d) Defibrillation usually required multiple countershocks in the untreated heart but after the drug took effect the ventricle rarely required more than a single countershock to defibrillate.

While the drug has had a clinical trial as a hypotensive agent, its blood pressure lowering properties were disappointing and it has been virtually abandoned for this purpose. The doses required for protection against ventricular fibrillation are greater than those that were used for treating hypertension. Dosages range from about 5 to 50 mg. per kg. of body weight depending upon mode and frequency of administration. A patient anticipating heart surgery would normally be given a series of smaller intramuscular doses beginning several days before. In an emergency situation a larger intravenous dose would be given, usually accompanied by heart massage. A person likely to be susceptible to acute coronary occlusion or acute coronary insufficiency may be given prophylactic doses at time intervals ranging from once a day to three or four times a day.

The compound of the present invention may be presented in pharmaceutical preparations prepared by any of the well-known methods of pharmacy.

For oral administration, fine powders or granules of the compound may contain diluents and dispersing and surface active agents, and may be prepared in a draft in water or in a syrup, in capsules or cachets in the dry state or in a non-aqueous suspension, when a suspending agent may be included; in tablets, when binders and lubricants may be included; or in a suspension in water or a syrup or an oil, or in a water/oil emulsion, when flavouring, preserving, suspending, thickening and emulsifying agents may be included. The granules or the tablets may be coated.

For parenteral administration, the compound may be presented in aqueous injection solutions which may contain antioxidants, buffers, bacteriostats, agents which solubilise a relatively insoluble compound, and solutes which render the salts isotonic with the blood; in aqueous suspensions when suspending agents and thickening agents may be included; or in non-aqueous solutions and suspensions if the compound is affected by water. Extemporaneous injection solutions may be prepared from sterile pills, granules or tablets which may contain diluents, dispersing and surface active agents, binders and lubricants.

A number of experiments were conducted in order to evaluate quantitatively the effect of bretylium tosylate in suppressing ventricular fibrillation. The following example is illustrative:

EXAMPLE II

A young male dog weighing 10.8 kg. was used. Its fibrillation threshold was measured at 17 milliamps-125 milliseconds. The dog was given bretylium at the rate of 5 mg./kg. intravenously over a five minute period. Ten minutes later fibrillation was induced at 20 milliamps-115 milliseconds but defibrillation occurred spontaneously after two seconds. Four minutes later the threshold was measured at 22 milliamps-120 milliseconds. Beginning 58 minutes after the initial administration of bretylium, the emergence time from induced fibrillation at increasing current levels and times were measured as follows:

| Time (measured from beginning administration of drug in minutes) | Emergence time (seconds) | Fibrillation threshold | |
|---|---|---|---|
| | | Milliamps | Millisec. |
| 58 | 2 | 24 | 120 |
| | 3 | 25 | 120,125 |
| | 2.5 | 27 | 125 |
| | 2.5 | 29 | 120 |
| | 4.5 | 32 | 120 |
| | 13.5 | 32 | 125 |
| | 7 | 33 | 125 |
| 69 | (1) | 34 | 125 |
| 99 | 2.5 | 34 | 120 |
| 102 | (2) | 34 | 125 |
| 130 | 2 | 32 | 120 |
| | 2 | 37 | 125 |
| | 3 | 38 | 125 |
| | 3.5 | 39 | 125 |
| | 3 | 46 | 120 |
| | 2 | 56 | 115 |
| 162 | (2) | 62 | 125 |
| 205 | 2.5 | 50 | 130 |
| | 2.5 | 53 | 130 |
| 207 | (2) | 57 | 180 |
| 250 | 2 | | |
| 263 | (2) | 66 | 125 |

[1] No spontaneous emergence (shock defibrillation necessary).

[2] No spontaneous emergence.

It will be seen that spontaneous defibrillation occurred up to the stimulation level at which the threshold had been increased 100%. Then, with the passage of time, it will be seen that the threshold was raised progressively until the end of the experiment, at which time the threshold had been increased 288%.

Because the peak effect of bretylium tosylate on suppression of fibrillation appeared to be reached several hours after administration; a further group of experiments was conducted in which bretylium was administered intramuscularly at the rate of 20–30 mg./kg. in the late afternoon of the day proceeding the experiment. Little or no outward effects were noted. The following morning a further dose of bretylium (20–30 mg./kg.) was administered intravenously. The average normal fibrillation threshold based on 60 dogs was found to be about 23 milliamps. In each instance the heart appeared to be well protected. In each instance the threshold at which fibrillation could be induced is raised several times over normal. This is illustrated by the following specific examples:

EXAMPLE III

A male dog weighing 12.3 kg. was injected at 4:45 p.m. with 20 mg./kg. bretylium intramuscularly. The following morning there were no adverse outward signs from the bretylium injection. Anesthesia was administered at 8:30 a.m. The heart appeared very protected. At 11:54 a.m. fibrillation was induced by application of a stimulus of 72 milliamps for 185 milliseconds, a threefold increase over the normal threshold. At 1.13 p.m. fibrillation was induced at 70 milliamps for 190 milliseconds. From 1:25 to 1:32 p.m. a further dose of bretylium (20 mg./kg.) was injected intravenously over a 5 minute period. At 2:07 no good responses were obtained up to 72 milliamps. At 3:45 p.m. shocks of 99 milliamps do not bring the heart into fibrillation. At 5:15 p.m. fibrillation is induced at 99 milliamps at 125 milliseconds. The heart proved very resistant to fibrillation. It must be noted that the meter used in these experiments had an upper limit of 100 milliamps.

EXAMPLE IV

A female dog weighing 14 kg. was injected with 20 mg./kg. bretylium intramuscularly at 4:30 p.m. During the next hour no outward effects were observed. The following morning at 8:30 a.m. an additional dose of 20 mg./kg. was administered intravenously and during the next hour no outward effects were noted. At 9:30 a.m. the dog was anesthetized. At 12:10 p.m. the heart is very protected. It comes out of fibrillatory periods of 6 seconds spontaneously. At 1:38 p.m. fibrillation is induced at 56 milliamps for 175 milliseconds. At 2:23 p.m. fibrillation is induced at 42 milliamps at 185 milliseconds. At 3:45 p.m. went up to 66 milliamps without fibrillation. The electrodes were removed, cleaned and sewed on another part of left ventricle. At 3:55 fibrillation was induced at 55 milliamps-190 milliseconds. Between 4:00 and 4:05 p.m. an additional 20 mg./kg. dose of bretylium was injected intravenously. At 4:55 fibrillation was induced at 52 milliamps-170 milliseconds. At 5:25 fibrillation was induced at 69 milliamps-180 milliseconds with a long extrasystolic period before fibrillation.

EXAMPLE V

A male dog weighing 11.4 kg. was given an initial 30 mg./kg. dose of bretylium intramuscularly at 4:00 p.m. on the first day. This was repeated at 3:00 p.m. on the second day. At 9:00 a.m. on the third day, 20 mg./kg. bretylium was given intravenously. Apart from fast breathing no outward effect was noted. Anesthesia was given at 9:45. By 12:40 p.m. the heart is protected. It comes out of fibrillation spontaneously. At 12:59 fibrillation is induced at 46 milliamps-150 milliseconds, a two-fold increase over the normal threshold.

EXAMPLE VI

A male dog weighing 18.6 kg. was injected with 30 mg./kg. bretylium intramuscularly at 4:45 p.m. A further mg./kg. dose was given intravenously the following morning at 8:30. The dog was anesthetized at 9:15. At 12:10 p.m. fibrillation is induced at 27 milliamps-130 milliseconds. At 2:20 the heart seems to be very protected. The threshold is greater than 99 milliamps, more than four times normal.

EXAMPLE VII

A female dog weighing 22.2 kg. was given 30 mg./kg. bretylium intramuscularly at 4:45 p.m. A similar dose was administered intravenously at 8:40 a.m. the following morning. The dog was very weak, breathing was difficult amd the dog was salivating but these effects wore off and by 9:30 a.m. the dog looked normal again when anesthesia was given. At 12:04 p.m. fibrillation was induced at 26 milliamps-140 milliseconds and the heart was very difficult to defibrillate. By 12:56 the fibrillation threshold had risen to 38 milliamps-140 milliseconds and the heart was easy to defibrillate. The heart came out of fibrillation spontaneously at values lower than 38 milliamps showing that the heart was protected. By 1:30 p.m. the fibrillation threshold had risen to 43 milliamps-140 milliseconds.

EXAMPLE VIII

A female dog weighing 15.6 kg. was pretreated by administering a first dose of bretylium intramuscularly at the rate of 5 mg./kg. at 3:30 p.m. on the first day, followed by similar doses at 8:30 a.m. and 4:30 p.m. of the second day. On the third day at 11:32 a.m. fibrillation was induced at 44 ma.-130 ms., an increase of 90% over the average normal fibrillation threshold. At 12:40 a fourth dose of bretylium of 5 mg./kg. was given intramuscularly. At 12:04 p.m. the fibrillation threshold was measured at 50 ma.-125 ms. At 1:29 the heart is very protected and comes out spontaneously in two seconds from fibrillation induced at 54 ma.-115 ms. The spontaneous difibrillation emergence times from fibrillation induced at increasing stimulation levels are as follows:

| Emergence Times (seconds) | Fibrillation Thresholds milliamps - milliseconds | |
|---|---|---|
| 2 | 54 | 115 |
| 2 | 58 | 110 |
| 2 | 62 | 105 |
| 3 | 62 | 110 |
| 3.5 | 63 | 110 |
| 3.5 | 63 | 110 |
| 2 | 65 | 110 |
| 2.5 | 66 | 105 |
| 3 | 67 | 105,110 |
| 2.5 | 68 | 110 |
| 2 | 69 | 115 |
| 2.5 | 72 | 110 |
| 4.5 | 74 | 110 |
| 3 | 74 | 115 |
| 2.5 | 77 | 110 |
| 2.5 | 78 | 110 |
| 5.5 | 82 | 100 |
| 6.5 | 83 | 100 |
| 4 | 84 | 100 |
| 4 | 85 | 100 |
| 7 | 87 | 100 |
| 3.5 | 88 | 105 |
| 6 | 90 | 110 |
| 3 | 94 | 110 |
| 5.5 | 95 | 110 |
| 7 | 98 | 105 |

At 2:27 the heart was subjected to continuous stimulation at 99.9 ma.-105 ms. (the upper current limit of the apparatus used, a threshold increase of 343%). After three seconds of fibrillation the heart tries for two seconds to come out. Then, after seven seconds of tachycardia and 19 seconds of fibrillation the stimulation was stopped and the heart defibrillated with only one shock. At 3:09 the circumflex artery was tied. At 3:19 a fifth dose of bretylium was administered intramuscularly. There was no spontaneous fibrillation after the circumflex artery had been tied.

A comparison was made between bretylium tosylate and Dilantin, a well-known anticonvulsant drug, to determine their relative effectiveness in suppressing ventricular fibrillation. The experiment was as follows:

EXAMPLE IX

The fibrillation threshold of a female dog weighing 10.9 kg. was measured at 32 ma.-120 ms. The position of the electrodes was changed and the fibrillation threshold was then measured at 20 ma.-115 ms. Dilantin was administered intravenously at the rate of 4 mg./kg. over a period of five minutes. Thirty minutes after the initial administration of the drug fibrillation occurred at 32 ma.-100 ms. Twenty-three minutes later fibrillation occurred at 30 ma.-90 ms. Forty-seven minutes later fibrillation was induced at 25 ma.-90 ms. The maximum threshold increase due to administration of Dilantin amounted to only 14%.

Twenty-one minutes later bretylium tosylate was administered intravenously over a three minute period at the rate of 5 mg./kg. Only a minute later the heart is found to be protected and comes out of fibrillation after one second. One hour and four minutes after the initial administration of bretylium the fibrillation threshold has been increased 57% to 44 ma.-105 ms. and the heart is easy to defibrillate after 14 seconds of fibrillation. One hour and 22 minutes after the initial administration of bretylium a further 5 mg./kg. dose is administered intraveneously over a three minute period. Two hours and a half after administration of the first bretylium dose and one hour and eight minutes after administration of the second dose the heart is found to be very protected. The threshold is measured at more than 99.9 ma.-105, 110 ms., the maximum milliamp reading possible with the meter being used. This represents an increase in the threshold of more than 257%. In fact the threshold has been raised almost infinitely as demonstrated by the fact that continuous stimulation at 99.9 ma.-120 ms. required 45 seconds to induce fibrillation. This compares with the only 14% increase attributable to Dilantin.

Digitalis toxicity produced by intraveneous injection of oubane manifested by multifocal ectopic ventricular extrasystoles and complete atrio-ventricular dissociation has been found to be consistently reversed by bretylium.

The drug according to the present invention is useful for the prevention and treatment of ventricular fibrillation and other ventricular arrhythmias brought about by various clinical situations which are prone to produce such arrythmias, particularly myocardial infarction due to acute coronary occlusion or during episodes of acute coronary insufficiency likely to result in acute myocardial infarction. The drug is also useful for the prevention and treatment of arrhythmias resulting from digitalis intoxication, to be given during the period of such manifestations of toxicity until enough digitalis has been excreted so that the toxic state is ameliorated. In addition this agent is useful in other clinical conditions that produce cardiac arrhythmias, particularly ventricular and atrial premature beats.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A method for suppressing cardiac ventricular fibrillation and cardiac ventricular arrhythmias in living beings which comprises administering bretylium tosylate to said beings in a small but effective amount at least sufficient to restore sinus rhythm.

2. A method according to claim 1 further characterized in that said [salt] *bretylium tosylate* is administered in amounts ranging from about 5 to 50 mg. per kg. of body weight.

3. A method according to claim 2 further characterized in that said [salt] *bretylium tosylate* is administered in emergency treatment of *ventricular fibrillation in living beings with* acute coronary occlusion intravenously in aqueous solution in amounts ranging from about 20 to 50 mg. per kg. of body weight accompanied by vigorous massage to hasten circulation of said drug to the heart and overcome resistance to electrical defibrillation.

4. A method according to claim 2 further characterized in that said [salt] *bretylium tosylate* is administered in emergency treatment of *ventricular fibrillation in living beings with* acute coronary insufficiency intravenously in aqueous solution in amounts ranging from about 20 to 50 mg. per kg. of body weight accompanied by vigorous massage to hasten circulation of said drug to the heart and overcome resistance to electrical defibrillation.

5. A method for suppressing cardiac ventricular fibrillation and cardiac ventricular arrhythmias in living beings which comprises administering to said beings a small but effective amount at least sufficient to restore sinus rhythm of bretylium tosylate in oral dosage at time intervals ranging from about every six to eight hours to once a day.

*6. A method for suppressing cardiac ventricular fibrillation in living beings which comprises administering bretylium tosylate to said beings in a small but effective amount at least sufficient to restore sinus rhythm.*

*7. A method according to claim 6 wherein said bretylium tosylate is administered intravenously.*

*8. A method for suppressing cardiac ventricular arrhythmias in living beings which comprises administering bretylium tosylate to said beings in a small but effective amount at least sufficient to restore sinus rhythm.*

*9. A method according to claim 8 wherein said arrhythmias are ventricular tachycardia.*

*10. A method according to claim 8 wherein said arrhythmias are ventricular premature beats.*

*11. A method according to claim 8 wherein said arrhythmias are ventricular extrasystoles.*

*12. A method according to claim 8 wherein said arrhythmias ae atrio-ventricular dissociation.*

*13. A method according to claim 8 wherein said bretylium tosylate is administered intravenously.*

* * * * *

UNITED STATES PATENT AND TRADEMARK OFFICE

CERTIFICATE OF CORRECTION

PATENT NO. : RE 29,618

DATED : April 25, 1978

INVENTOR(S) : Marvin B. Bacaner

It is certified that error appears in the above-identified patent and that said Letters Patent are hereby corrected as shown below:

In the heading, under PUBLICATIONS, line 4, "Connecticut" should be --, Conn--; line 6, "Anti-Arrhythmie" should be --Anti-arrhythmic--.

Column 4, line 44, "prepared" should be --presented--.

Column 5, line 48, "proceeding" should be --preceding--.

Column 10, line 18, (Claim 12, line 2) "ae" should be --are--.

Signed and Sealed this

*Seventeenth* Day of *October 1978*

[SEAL]

*Attest:*

RUTH C. MASON
*Attesting Officer*

DONALD W. BANNER
*Commissioner of Patents and Trademarks*